July 23, 1929.  R. H. BERTRAM  1,721,984
AUTOMOBILE HOOD LOCKING DEVICE
Filed March 19, 1927   2 Sheets-Sheet 1
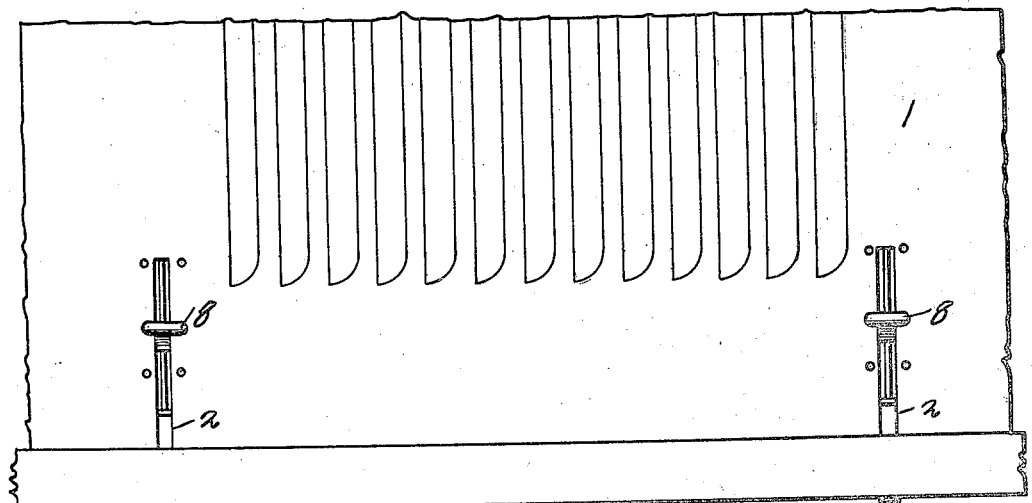
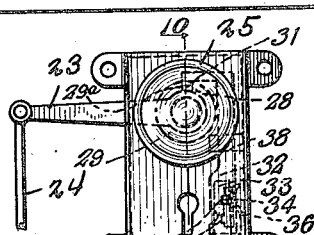
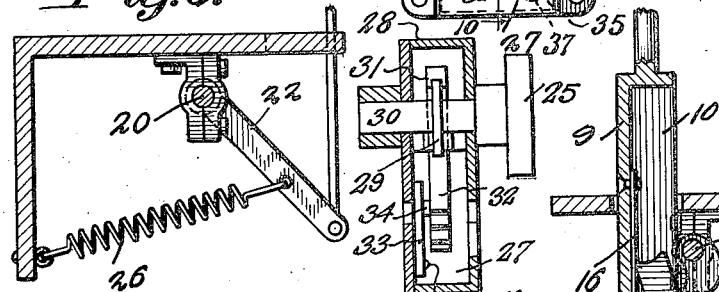
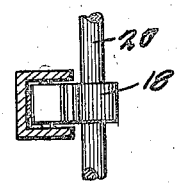
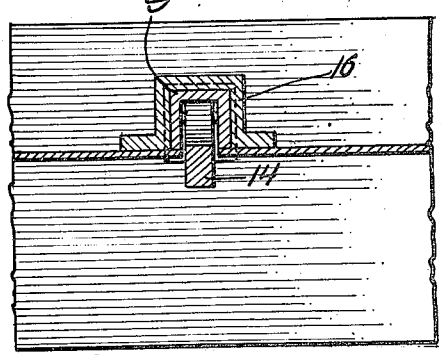
Robert H. Bertram, Inventor

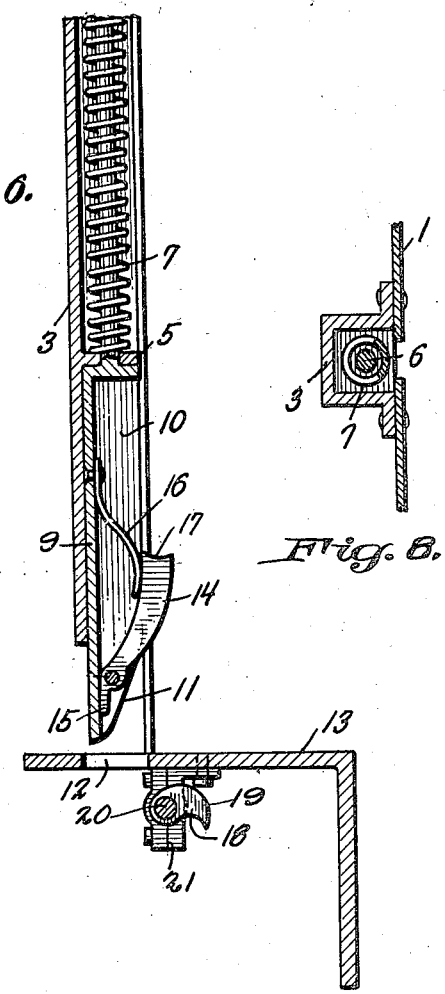
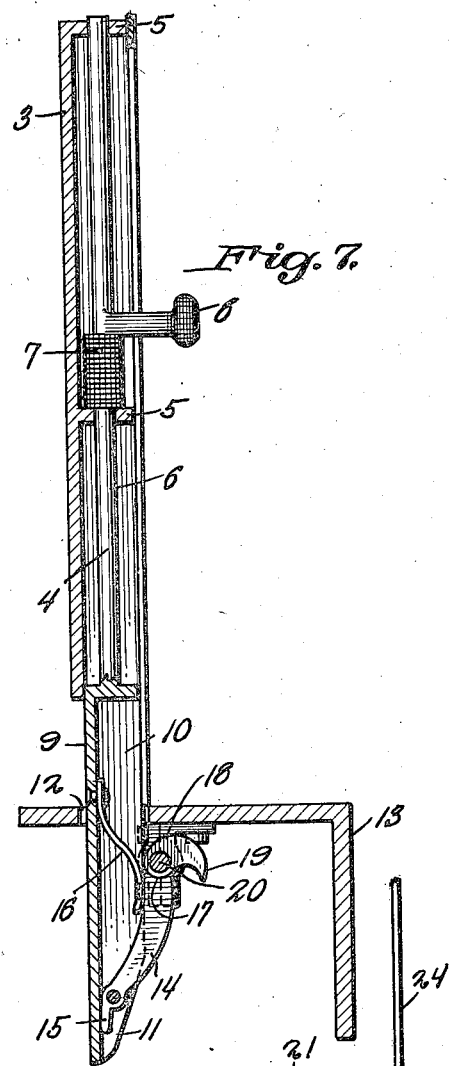
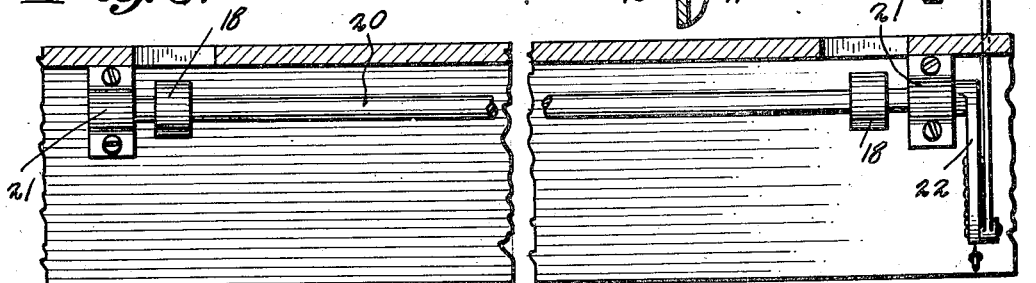

Patented July 23, 1929.

1,721,984

UNITED STATES PATENT OFFICE.

ROBERT H. BERTRAM, OF DAVENPORT, IOWA.

AUTOMOBILE HOOD-LOCKING DEVICE.

Application filed March 19, 1927. Serial No. 176,732.

This invention relates to a hood locking device for automobiles, and has for its primary object a construction whereby the hood can be locked to the frame of an automobile at a plurality of points so that the hood cannot be moved to raised position by an unauthorized person.

An object of the invention is the construction of a device that will not only lock the hood in position but accomplish this result in in a manner to eliminate rattling or loose connections.

An object of the invention is to combine with a novel form of latch structure, operating mechanism therefor that may be extended to any convenient position and manually operated and a lock associated with the operating mechanism so as to prevent the operation thereof by an unauthorized person.

A feature of the invention is the novel manner of constructing and assembling the various parts so as to be very readily incorporated with the automobile structure and when in place all vital parts will be completely housed and hidden.

With these and other objects in view, my invention will be better understood from a description of the same taken in connection with the accompanying drawings, wherein:—

Figure 1 is a side elevation of a portion of an automobile hood showing my invention applied thereto;

Figure 2 shows the plunger depressed and about to enter into interlocking engagement with the latch element;

Figure 3 is a sectional view of a portion of the control mechanism;

Figures 4 and 5 are cross sectional views;

Figure 6 is an enlarged view of the plunger structure in its normal position;

Figure 7 is a similar view depressed into interlocking engagement with the latching element;

Figure 8 is a cross sectional view of the plunger;

Figure 9 is a plan view of the shaft and its associated parts, and

Figure 10 is a vertical cross section taken on the line 10—10 of Figure 3.

Again referring to the drawings illustrating one of the many constructions of my invention, it will be noted that the hood 1 is provided with slots 2 which register with the channel plates 3 that are riveted to the hood. These channel plates 3 form the sole support for the plunger structure 4 that is slidably mounted in the ears 5, a component part of the plate. As this plate is of channel formation, it will be appreciated that the stem 6 of the plunger is properly housed and protected. A spring 7 encircling the stem and abutting the knob 8 of the plunger and the associated ear 5 is utilized to hold the plunger normally in its elevated position. The plunger proper 9 is provided with a groove 10 and a cam surface 11 for facilitating the passage of the plunger through the openings 12 in the frame 13 of the automobile. It is, of course, to be understood that this frame may be formed of a separate element attached to the frame structure of the automobile, dependent upon which is the most practical in use.

Pivotally mounted within the groove 10 is a bolt 14, one end of which is provided with a lug 15 for limiting the pivotal movement of the bolt by the action of the leaf spring 16. This bolt is further provided with a curved nozzle 17 having interlocking engagement with a keeper 18 under predetermined conditions. It will be appreciated that the lug 15 assures the proper aligning of the notch 17 with the cooperative portion of the keeper 18.

This keeper 18, which is of cam-shaped formation, has a nose portion 19 so disposed that in the rocking of the keeper engagement of the nose 19 with the bolt will force the latter out of interlocking engagement with the keeper.

To accomplish this movement of the latch element in the most satisfactory manner and from a remote point if found necessary, the keeper 18 is rigidly secured to a shaft 20 that in turn is mounted in the bearings 21 carried by the frame. One end of the shaft has secured thereto a crank 22 that is in turn flexibly connected to an arm 23 by the link 24. The spring 26 connected to the crank 22 normally holds the various parts in their proper position to hold the nose 19 out of engagement with the bolt 14. Connected to the arm 23 is a knob 25 whereby the control mechanism may be manipulated for giving the required movement to the shaft 20 for throwing the nose 19 into and out of operative engagement with the bolt 14. The lock structure comprises a casing 28 in which 29 is a retaining disc carried by the shaft 30 and provided with a depression 29$^a$ to receive the projection 31 of the bolt 32. 33 is a tumbler pivoted to the casing 28 at 37 and provided with a pin 34 that seats in either of the recesses 32$^a$ formed in the wall of the slot 35 of the bolt 32. 36 is a spring that presses the tumbler 33 to cause automatic seating of the pin 34 in either of the recesses 32ª. 38 is a guide for the bolt 32. Of course, it is to be understood that the mechanism may be complete, as heretofore set forth, as far as the operation of the various parts is concerned for securing the hood in position, but there is an additional advantage in providing the lock structure 27 for locking the control mechanism.

It will now be appreciated that I have designed and constructed a novel lock device for hoods having the dual function of locking the hood against movement and yieldably holding the hood against rattling. It will also be appreciated that I provide a lock device of substantial construction that may be very easily moved into and out of locking position and when in locking position effectively and substantially held against return movement to unlocking position. By the simple operation of turning the knob 25, the control mechanism can be operated for giving partial rotation to the shaft 20 for moving the keeper into and out of operative engagement with the pivoted bolt 14 for moving the parts to releasing position, the various parts automatically moving to retaining position on the depression of the plunger.

It is, of course, to be understood that the various parts may be designed in various other manners than illustrated and associated in other relations and, therefore, I do not desire to be limited in any manner except as set forth in the appended claims.

I claim:—

1. A lock device for automobile hoods comprising a slidably mounted plunger, interlocking means for the plunger when the latter is moved to a predetermined position, and manually operated means for releasing the first-mentioned means.

2. A lock device for automobile hoods comprising a spring-controlled plunger slidably supported by the hood, a locking element for cooperation with said plunger, and manually operated means for manipulating said lock element.

3. A lock device for automobile hoods comprising a plunger slidably carried by the hood, a swingingly mounted keeper for movement into interlocking engagement with the plunger, and manually operated link mechanism for operating the keeper.

4. A lock device for automobile hoods comprising, in combination, a plate carried by the hood, a plunger slidably supported by the plate, a spring for holding the plunger in its elevated position, a lock element interlocking with said plunger when the latter is depressed, link mechanism for giving a releasing movement to the lock element, and a manually operated device controlling the movement of said link mechanism.

5. In combination with the hood and frame of an automobile, a lock device comprising a lock element supported by the frame in concealed position, a plunger slidably supported by the hood for movement into locking engagement with said keeper, link mechanism for releasing said lock element including a swingingly mounted arm, and a manually operated structure controlling the movement of the arms 6. In combination with the hood and frame of an automobile, a shaft concealed for movement by said frame, a lock element carried by said shaft, a plunger structure slidably supported by the hood and including a pivoted bolt for movement into engagement with said lock element, and means for moving the lock element out of locking engagement with said bolt.

7. In combination with the hood and frame of an automobile, a shaft concealed for movement by said frame, a lock element carried by said shaft, a plunger structure slidably supported by the hood and including a pivoted bolt for movement into engagement with said lock element, and means for moving said bolt out of locking engagement therewith.

8. A lock structure comprising a slidably mounted plunger, a spring for holding the plunger in its elevated position, a rotatably mounted shaft, a cam-shaped lock element carried by said shaft, a bolt pivoted to the plunger to move into interlocking engagement with the lock element when the plunger is depressed, and manually operated mechanism for giving movement to the shaft, thereby moving said lock element to a position to force the bolt out of interlocking engagement therewith.

In testimony whereof I affix my signature.

ROBERT H. BERTRAM.